Oct. 21, 1969   G. R. PEARCE ET AL   3,474,300
ENCAPSULATED CAPACITOR MADE OF THERMOPLASTIC MATERIALS
Original Filed Sept. 8, 1964   2 Sheets-Sheet 1
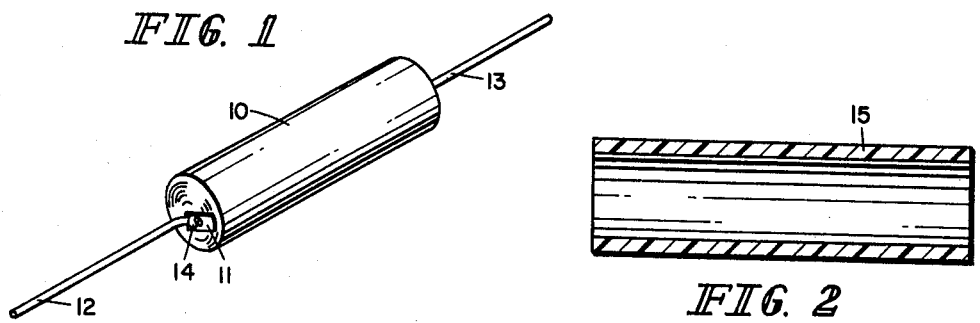
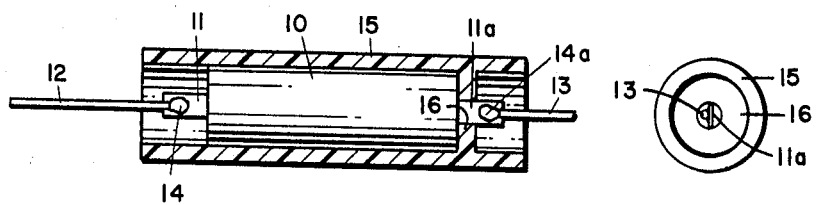
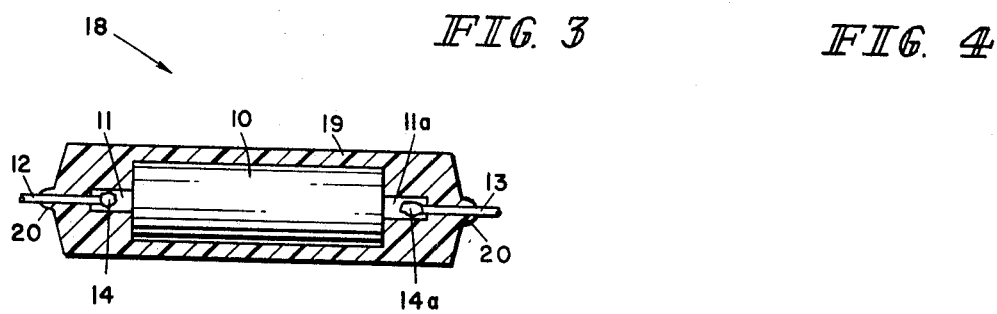
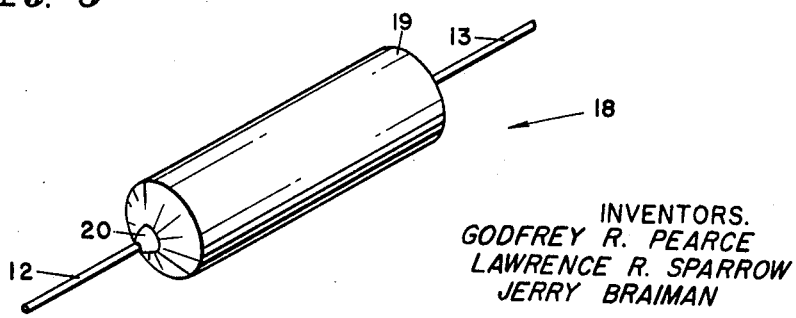
INVENTORS.
GODFREY R. PEARCE
LAWRENCE R. SPARROW
JERRY BRAIMAN
BY
ATTORNEY Oct. 21, 1969  G. R. PEARCE ET AL  3,474,300
ENCAPSULATED CAPACITOR MADE OF THERMOPLASTIC MATERIALS
Original Filed Sept. 8, 1964  2 Sheets-Sheet 2

INVENTORS.
GODFREY R. PEARCE
LAWRENCE R. SPARROW
JERRY BRAIMAN
BY
ATTORNEY

United States Patent Office 3,474,300
Patented Oct. 21, 1969

3,474,300
ENCAPSULATED CAPACITOR MADE OF THERMOPLASTIC MATERIALS
Godfrey R. Pearce, Lawrence, and Lawrence R. Sparrow and Jerry Braiman, Indianapolis, Ind., assignors to P. R. Mallory & Co. Inc., Indianapolis, Ind., a corporation of Delaware
Original application Sept. 8, 1964, Ser. No. 394,838, now Patent No. 3,261,902. Divided and this application Feb. 16, 1966, Ser. No. 567,018
Int. Cl. H01g 9/00; B29f 1/10
U.S. Cl. 317—230                                    13 Claims

ABSTRACT OF THE DISCLOSURE

A convolutely wound capacitor body having a plurality of leads is affixed into a preformed thermoplastic sleeve and at least one thermoplastic end portion is provided having projections thereon which sealingly engage at least one terminal wire projecting from the capacitor body.

---

This is a division of application Ser. No. 394,838, filed Sept. 8, 1964.

The present invention relates to electrolytic devices and more particularly relates to means and methods for providing a seal for electrolytic capacitors by encapsulation and is a continuation in part of Mallory owned application No. 238,194.

Prior experience in the capacitor art has clearly established the need for providing efficient protective sealing means for capacitor units. The sealing means must be moisture resistant, resistant to chemical attack, resistant to vapors, resistant to head distortion, mechanically rigid, capable of containing electrolyte and capable of preserving the electrolyte and capable of preserving the electrical properties of the capacitor units.

The continual advancement of plastics technology has brought forth the use of many materials for capacitor encapsulation. Furthermore, the development of new and improved molding techniques has afforded great flexibility in encapsulation methods. However, it is not known in the art to mold directly to the wet capacitor body. There are known methods wherein the wound capacitor body is placed in a premolded sleeve, a plug or stopper is inserted into the hollow ends of said sleeve to provide a sealing means, a mass of plastic is injected over the plug to increase the sealing effect. This provides a presealed capacitor which is packaged in plastic as described in the Miquielis patent, U.S. No. 2,970,182, issued Jan. 31, 1961. The intermediate step in the multistage sealing process of inserting a stopper or plug to each end of the capacitor body was thought necessary to prevent physical disturbance of the capacitor body from the elevated molding pressures and temperatures. It was previously thought impossible to mold directly to a wet unit.

A long-standing need has existed, therefore, for means and methods whereby an encapsulated capacitor assembly having superior physical, mechanical and electrical properties can be economically produced with a high degree of reliability. The present invention meets this need and has hereupon contributed an extraordinary advancement in the capacitor art.

It is, therefore, an object of the present invention to provide a novel and extremely economical encapsulated capacitor which overcomes the disadvantages of prior art.

It is an object of the present invention to provide an encapsulated capacitor with a homogeneous casing having excellent mechanical rigidity, high resistance to heat distortion, outstanding low temperature physical characteristics, low thermal coefficient of expansion, and extremely low moisture absorption.

It is an object of the present invention to disclose a novel two-stage encapsulation technique which permits molding end seals around a wet unit.

It is further an object of the present invention to guarantee a safe minimum wall thickness of the capacitor casing by means of a two-stage molding process wherein a preformed housing section is employed as the first-stage element.

Still another object of the present invention is to utilize an efficiently preimpregnated capacitor body housed in a preformed case and to mold directly to the wet capacitor body.

It is another object of the present invention to provide an encapsulated capacitor having projections which sealingly engage one or more terminal wires which extend from the capacitor body.

It is another object of the present invention to provide a preformed sleeve for use in encapsulating a capacitor body having means for positioning the capacitor body within the sleeve.

The present invention, in another of its aspects, relates to novel features of the instrumentalities described herein for teaching the principal object of the invention and to the novel principles employed in the instrumentalities, whether or not these features and principles may be used in the said object and/or in the said field.

Other objects of the invention and the nature thereof will become apparent from the following description taken in conjunction with the accompanying figures of the drawing and wherein like reference characters describe elements of similar function therein and wherein the scope of the invention is determined rather from the dependent claims.

For illustrative purposes, the invention will be described in connection with the accompanying drawings in which:

FIGURE 1 is a perspective view of a typical preimpregnated, convolutely wound capacitor body with axial terminal wires attached, capable of being provided with a plastic casing according to the present invention.

FIGURE 2 is a longitudinal sectional view of a preformed plastic cylindrical sleeve.

FIGURE 3 is a sectional view of the capacitor body positioned in the preformed sleeve.

FIGURE 4 is an end view of the preformed sleeve.

FIGURE 5 is a sectional view of the capacitor after molding.

FIGURE 6 is a view in perspective of the molded, axial lead capacitor.

Figure 7:
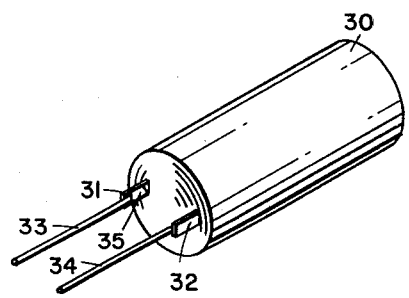
FIGURE 7 is a perspective view of a typical preimpregnated, convolutely wound capacitor body with single end leads attached, prior to encapsulation.

Generally speaking, the present invention provides means or methods for economically encapsulating a wet capacitor body within a thermoplastic casing through a two-stage molding process. The initial step of the two-stage process consists of molding a thermoplastic casing in a geometrical shape substantially equivalent to the contour of the preimpregnated capacitor body to be encased. Depending upon the particular geometry of the part to be encased, either one or two closure surfaces are intentionally omitted from the preformed sleeve, thereby permitting rapid insertion of the capacitor body within the sleeve in preparation for the final molding stage.

The capacitor is then positioned in a suitable mold cavity and a thermoplastic compatible with the sleeve material is injected into the remaining closures, thereby producing a capacitor assembly with superior physical, mechanical and electrical properties.

Two representative embodiments of the present invention will be described in detail herein as being illustrative of the special features of the invention. One embodiment comprises the encapsulation of an axial lead capacitor, and the second embodiment comprises the encapsulation of a single ended capacitor.

Referring now to the drawings, the convolutely wound capacitor body 10 shown in FIGURE 1 is substantially cylindrical in shape, and is usually not more than a fraction of an inch in diameter and not more than two inches in length, although not confined to said specifications. The illustrative example shown herein is an aluminum foil sheet interwound with an absorbent material such as paper, and impregnated with a liquid electrolyte such as a compounded mixture consisting principally of ethylene glycol and boric acid, although not limited to such. A metal tab 11 is provided at each end of the cylindrical body for attachment of terminal wires 12 and 13. Terminal wires 12 and 13 are welded to the respective capacitor tabs at junction 14.

FIGURE 2 is a sectional view of the preformed cylindrical thermoplastic sleeve 15, which constitutes the first step in the two-stage molding process of the present invention. As sleeve 15 is individually fabricated, the physical dimensions thereof can be controlled as necessary to insure adequate wall strength in the event that no addition of thermoplastic material occurs to the inside cylindrical wall during the final encapsulation process. Sleeve 15 may be formed as shown in FIGURE 2 or with a positioning shoulder 16 as shown in FIGURE 3. Shoulder 16 serves as a positioning means for capacitor 10.

FIGURE 3 shows capacitor 10 oriented inside sleeve 15 with leads 12 and 13 projecting therefrom. Sleeve 16 serves as a positioning means to insure adequate seal strength at both ends of the completed unit.

FIGURE 4 is an end view of sleeve 15 showing recessed shoulder 16 having aperture 17 with lead 13 projecting therefrom.

FIGURE 5 illustrates the completed encapsulated capacitor 18. As can be seen from the drawing, the injection of end seals produces a homogeneous housing of thermoplastic material 19 having superior protective properties. Mechanical closure around leads 12 and 13 is insured by projections 20. Owing to the shrinkage characteristics of thermoplastics, an extension 0.040 inch to 0.200 inch long and 0.004 inch to 0.040 inch thick per side about the wire insures a seal. It can be further seen in FIGURE 5 that the injected plastic forms a seal between the wet capacitor body 10 and capacitor tabs 11 and 11a and guarantees encapsulation of welds 14 and 14a thereby preventing contact between welds 14 and 14a and the electrolyte, which would result in corrosion of the weld.

The view in perspective of the encapsulated capacitor 18 shown in FIGURE 6 reveals the smooth, compact and functional appearance of the capacitor, with only terminal wires 12 and 13 and molded sealing projections 20 projecting therefrom. It has been found that no special plugging provisions are necessary for insuring tightness of the end seal around terminal wires 12 and 13 as the end closure material effects a secure bond thereto.

Figure 8:
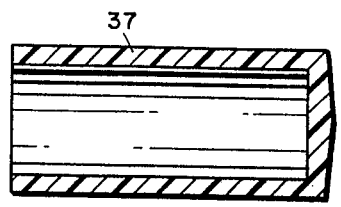
FIGURE 8 is a sectional view of a preformed sleeve for the single-end unit.
Figure 9:
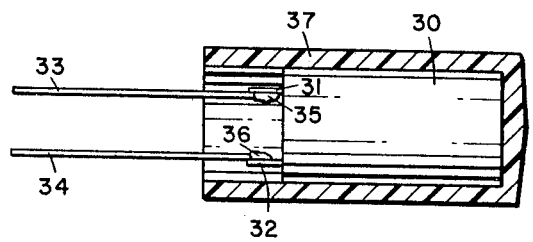
FIGURE 9 is a sectional view of the capacitor body positioned in the sleeve prior to molding.

Referring to FIGURES 7 through 11 for an illustration of a second embodiment of the present invention, encapsulation of a single-ended lead capacitor is contemplated. FIGURE 7 shows a convolutely wound preimpregnated capacitor body 30 having anode tab 31 and cathode tab 32 extending from a single end of capacitor 30. Tabs 31 and 32 have leads 33 and 34 welded thereto at junctions 35 and 36. The preformed cylindrical sleeve having one open end is shown in FIGURE 8. Capacitor 30 is positioned in sleeve 37 as shown in FIGURE 9 and an end seal of a thermoplastic compatible with that of sleeve 37 is injected.

Figure 10:
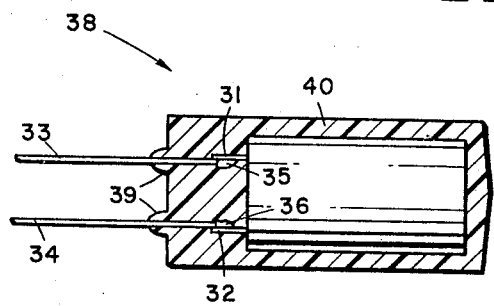
FIGURE 10 is a sectional view of the molded, single end lead capacitor.

FIGURE 10 shows the encapsulated capacitor 38 after injection of an end seal. It can be seen that the injected plastic has formed a unitary body with the preformed sleeve 37 (FIGURE 9) and that the injected plastic forms a seal between the wet capacitor body 30 and capacitor tabs 31 and 32 and guarantees encapsulation of weld joints 35 and 36 thereby preventing electrolyte corrosion at joints 35 and 36. Molded sealing projections 39 is utilized to ensure a good mechanical seal.

Figure 11:
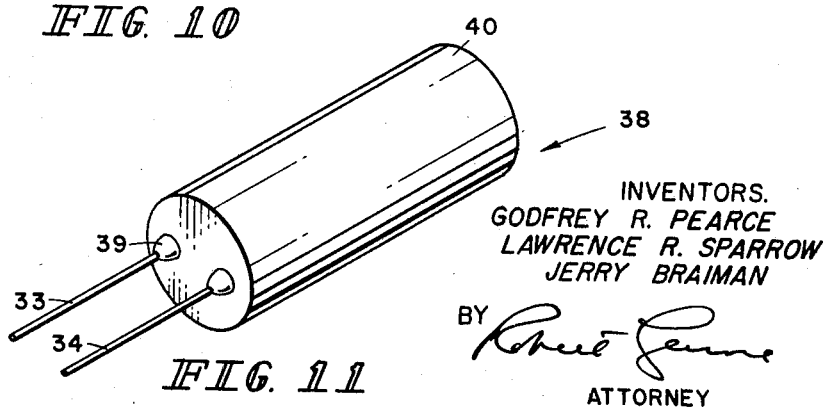
FIGURE 11 is a perspective view of the molded, single-ended lead capacitor.

FIGURE 11 is a perspective view of the encapsulated capacitor 38 showing the smooth, compact and functional appearance thereof, with only terminal wires 34 and 35 and end projections 39 projecting therefrom.

Successful encapsulation by the molding process of the present invention has been consistently repeated with a number of thermoplastic materials such as polypropylene, polyethylene, polyamide, polystyrene, polycarbonate, and polyurethane resins. However, polypropylene resins are preferred for economic reasons and the physical properties obtained.

The present invention, therefore, discloses means for producing an efficient, economical and reliable molded capacitor, encapsulated with a suitable thermoplastic and having the following specific advantages: desirably low differential expansion between the encasement material and the terminal wires; high heat distortion level so as to resist soldering heat; superior molding characteristics which provide complete coalescence between the molten mass being introduced and the preformed casing, both of like material; extremely low moisture absorption; high impact strength and rigidity; thermal self venting and gas permeability; and retention of good physical properties at temperatures as low as −55° C.

The two-stage molding process of the present invention offers one very distinct advantage, viz., the assurance that the wall thickness of the finished capsule can never be less than the wall thickness of the pre-formed sleeve, regardless of how badly misaligned the capacitor body becomes during processing. A collateral advantage of this process is the option of using any desired coloring in the second-stage molding process to identify polarity on axial lead capacitor units. Furthermore, total encapsulation of the terminal connection prevents inadvertent contact between the electrolyte and the connector parts, thus avoiding corrosion effects thereupon. The main advantage of the present invention is the molding of end seals directly to a wet unit, which was heretofore thought impossible by those skilled in the art.

The encapsulated capacitor of the present invention, as hereinbefore described, is merely illustrative and not exhaustive in scope. Since many widely different embodiments of the invention may be made without departing from the scope thereof, it is intended that all matter contained in the above description and shown in the accompanying drawing shall be interposed as illustrative and not in a limiting sense.

Having thus described our invention, we claim:
1. An encapsulated capacitor assembly comprising:
   a capacitor body having at least one terminal wire attached thereto;
   a preformed thermoplastic sleeve having at least one open end and means including a shoulder on an inner wall surface for positioning said capacitor body therein;
   said capacitor body positioned within said sleeve so that only said terminal wire extends from said sleeve;
   at least one molded thermoplastic end seal closing said open end, said seal having thermoplastic properties similar to those of said preformed sleeve and being fused to said sleeve, thereby producing a unitary capacitor capsule;

said end seal having at least one terminal projection for said terminal wire, said projection adhering tightly to said terminal wire to provide complete encapsulation of said capacitor body.

2. A capacitor according to claim 1 in which said sleeve has two open ends which are closed with end seals.

3. A capacitor according to claim 1 in which said sleeve has one open end which is closed with an end seal.

4. A capacitor according to claim 1 in which terminal projections are provided for each terminal wire attached to said capacitor body.

5. A capacitor according to claim 1 in which said shoulder is disposed between the ends of said preformed sleeve.

6. A capacitor according to claim 2 in which said capacitor has at least one terminal wire projecting through each end seal.

7. A capacitor according to claim 3 in which at least two terminal wires pass through said end seal.

8. A capacitor according to claim 1 in which said sleeve and said end seal are made of substantially the same thermoplastic material.

9. A capacitor according to claim 1 in which said capacitor body is a convolutely wound, preimpregnated capacitor body.

10. A capacitor according to claim 1 in which said sleeve and said end seal are made from a thermoplastic material selected from the group consisting of polypropylene, polyethylene, polyamide, polystyrene, polycarbonate and polyurethane resins.

11. A capacitor according to claim 10 in which said sleeve and said end seal are made of substantially the same thermoplastic material.

12. A capacitor according to claim 11 in which the thermoplastic material used is a polypropylene resin.

13. A capacitor according to claim 1 in which said sleeve is cylindrical.

References Cited

UNITED STATES PATENTS

| | | | |
|---|---|---|---|
| 2,970,182 | 1/1961 | Miquelis | 317—230 X |
| 3,221,089 | 11/1965 | Cotton | 264—272 X |
| 3,226,463 | 12/1965 | Wallace | 264—272 |
| 3,277,350 | 10/1966 | Pearce et al. | 317—230 |
| 3,296,505 | 1/1967 | Sparrow et al. | 317—230 |

JAMES D. KALLAM, Primary Examiner

U.S. Cl. X.R.

264—272; 317—242